No. 885,704.  
PATENTED APR. 21, 1908.  
G. J. TAYLOR.  
MOTOR VEHICLE.  
APPLICATION FILED OCT. 19, 1907.

Witnesses.  
Inventor.  
George J. Taylor  
by attorneys

UNITED STATES PATENT OFFICE.

GEORGE J. TAYLOR, OF SALT LAKE CITY, UTAH, ASSIGNOR OF ONE-HALF TO ALONZO E. HYDE, OF SALT LAKE CITY, UTAH.

MOTOR-VEHICLE.

No. 885,704.  Specification of Letters Patent.  Patented April 21, 1908.

Application filed October 19, 1907. Serial No. 398,226.

*To all whom it may concern:*

Be it known that I, GEORGE J. TAYLOR, a citizen of the United States, and resident of Salt Lake City, in the county of Salt Lake and State of Utah, have invented a new and useful Improvement in Motor-Vehicles, of which the following is a specification.

My invention consists in novel means combined with a motor vehicle for protecting the occupant of the vehicle from objectionable air pressure, from flying insects, particles of dust, dirt, etc., when the vehicle is in motion.

My invention more particularly consists in the provision of one or more rotary fans so located as to produce the desired results, the said fan or fans being preferably made of metal so that they may also be used for deflecting missiles, such as bullets, stones, etc. These rotary fans may be driven in any desired manner, as, for instance, by the motor which propels the vehicle or by the motion of the vehicle itself, or from the traction wheels directly.

Figure 1:
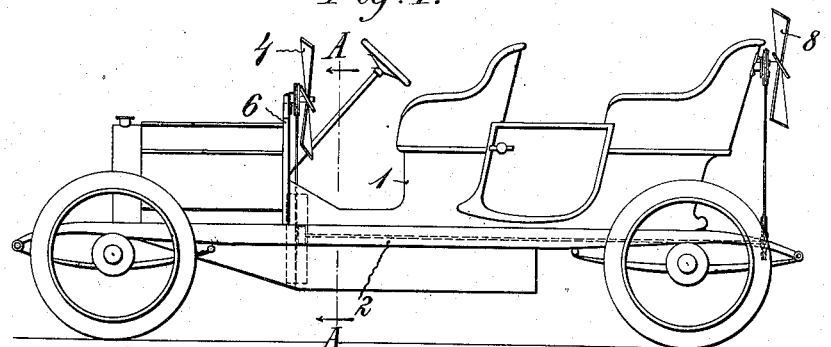
Figure 2:
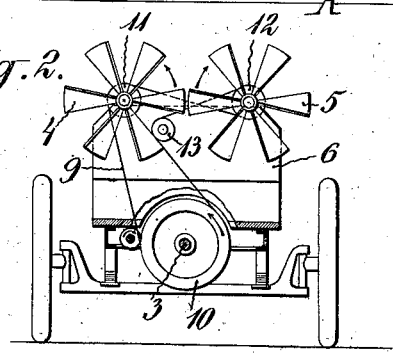
Figure 3:
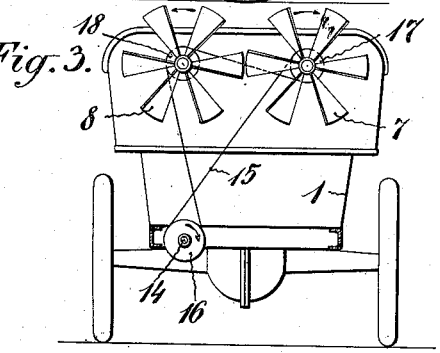
Figure 4:
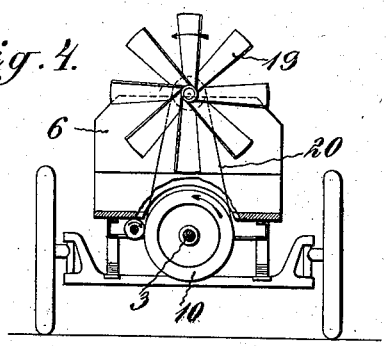
Figure 5:
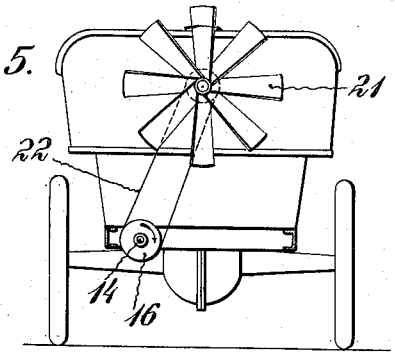
Figure 6:
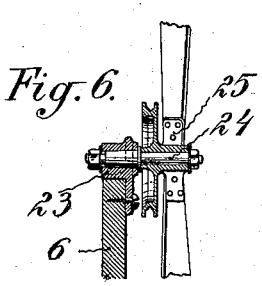
Figure 7:
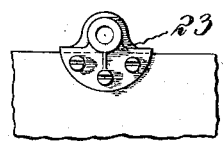

A practical embodiment of my invention is represented in the accompanying drawings, in which Figure 1 represents in side elevation a motor vehicle having a pair of oppositely rotating fans located at the front of the vehicle and a pair of oppositely rotating fans located at the rear of the vehicle, the said fans being driven from the motor, Fig. 2 is a section taken in the plane of the line A—A of Fig. 1, looking in the direction of the arrows, Fig. 3 is a rear view of the vehicle, a portion being broken away to show more clearly the drive for the fans, Fig. 4 is a view similar to Fig. 2 showing a single fan, Fig. 5 is a view similar to Fig. 3, showing a single fan, Fig. 6 is a detail section on an enlarged scale, showing one method of mounting the rotary fan, and Fig. 7 is a detail view showing the bracket for supporting the fan.

The motor vehicle in connection with which my invention is shown comprises the usual body 1 and chassis 2.

The motor shaft is denoted by 3.

In the form shown in Figs. 1, 2 and 3, two rotary fans 4 and 5 are mounted at the front of the vehicle, as, for instance, on the dash 6 and two rotary fans 7, 8, are mounted at the rear of the vehicle, as, for instance, on the back of the body 1. I have shown the fans 4 and 5 as being rotated from the motor shaft 3 by providing a driving belt 9 which passes around a driving pulley 10 on the motor shaft 3 and around pulleys 11 and 12 on the fans 4 and 5. To obtain rotary movement in opposite directions to the two fans 4 and 5, I also pass the driving belt 9 around an idler pulley 13 and cross the belt between the pulleys 11 and 12. The rotary fans 7 and 8 are driven in opposite directions from a shaft 14 driven by the motor, by providing a driving belt 15 which passes around a pulley 16 on the shaft 14 and also around pulleys 17, 18, on the fans 7 and 8.

In the form shown in Figs. 4 and 5, a single rotary fan 19 is located at the front of the vehicle and is driven by a belt 20 from the pulley 10 of the motor shaft 3. A single rotary fan 21 is mounted at the rear of the vehicle and is driven from the pulley 16 of the shaft 14 by a belt 22. One method of mounting the rotary fan on the vehicle is to provide a bracket 23 to which is attached a stud axle or shaft 24 on which the fan is mounted to rotate. The hub 25 of the fan may also be developed to form the pulley for the said fan. While I have shown these fans as being driven from the motor, it is to be understood that they may be driven directly from the vehicle wheels or simply by the momentum of the vehicle if so desired. These fans are preferably made of sufficient strength and of the required material to deflect missiles so as to give still greater protection to the occupant of the vehicle. It must furthermore be understood that these fans are of sufficient size and are so arranged as to thoroughly protect the occupant from wind pressure, dust, dirt, etc., when the vehicle is in motion. When the fan is being rotated it will not obscure to any extent the objects which the vehicle is approaching.

This invention will eliminate the necessity of the occupant wearing goggles, or uncomfortable or unsightly head gear and will also eliminate the necessity of the usual glass wind shields, which are so dangerous because of their liability to inflict great injury to the occupant when broken by flying missiles, or in accidents.

What I claim is:—

1. The combination with a motor vehicle, of a rotary fan mounted thereon in position to protect the occupant of the vehicle from wind pressure, dust, etc. and means for driving the fan in a direction to protect the said occupant when the vehicle is in motion.

2. The combination with a motor vehicle, of a rotary fan of missile deflecting material mounted thereon in position to protect the occupant of the vehicle from missiles and means for driving the fan in a direction to deflect the missiles and thus protect the said occupant when the vehicle is in motion.

3. The combination with a motor vehicle, of a rotary fan located at the rear of the vehicle in position to protect the occupant from wind pressure, dust, etc., when the vehicle is in motion.

4. The combination with a motor vehicle, of rotary fans located at the front and rear of the vehicle in position to protect the occupant from wind pressure, dust, etc., when the vehicle is in motion.

5. The combination with a motor vehicle and its motor, of a rotary fan mounted on the vehicle in position to protect the occupant from wind pressure, dust, etc., said fan being driven by the motor in a direction to protect the said occupant of the vehicle.

6. The combination with a motor vehicle and its motor, of a rotary fan of missile deflecting material driven by the motor and located in position to protect the occupant of the vehicle.

7. The combination with a motor vehicle and its motor, of a rotary fan driven by the motor and located at the front of the vehicle in position to protect the occupant of the vehicle.

8. The combination with a motor vehicle and its motor, of a rotary fan driven by the motor and located at the rear of the vehicle in position to protect the occupant of the vehicle.

9. The combination with a motor vehicle and its motor, of rotary fans driven by the motor and located at the front and rear of the vehicle in position to protect the occupant of the vehicle.

In testimony, that I claim the foregoing as my invention, I have signed my name in presence of two witnesses, this 10th day of October, 1907.

GEORGE J. TAYLOR.

Witnesses:
FRANK C. TAYLOR,
W. J. BATEMAN.